United States Patent
Pyun et al.

(10) Patent No.: US 12,298,472 B2
(45) Date of Patent: May 13, 2025

(54) CHALCOGENIDE HYBRID ORGANIC/INORGANIC POLYMERS FILMS AND COATINGS AND THE USE THEREOF

(71) Applicant: ARIZONA BOARD OF REGENTS ON BEHALF OF THE UNIVERSITY OF ARIZONA, Tucson, AZ (US)

(72) Inventors: Dong-Chul Pyun, Tucson, AZ (US);
Robert A. Norwood, Tucson, AZ (US);
Abhinav Nishant, Tucson, AZ (US);
Laura Anderson, Tucson, AZ (US);
Tristan Kleine, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 915 days.

(21) Appl. No.: 17/282,278

(22) PCT Filed: Oct. 1, 2019

(86) PCT No.: PCT/US2019/054084
§ 371 (c)(1),
(2) Date: Apr. 1, 2021

(87) PCT Pub. No.: WO2020/072503
PCT Pub. Date: Apr. 9, 2020

(65) Prior Publication Data
US 2021/0389504 A1   Dec. 16, 2021

Related U.S. Application Data

(60) Provisional application No. 62/740,372, filed on Oct. 2, 2018.

(51) Int. Cl.
*G02B 1/111* (2015.01)
*C09D 5/00* (2006.01)
(Continued)

(52) U.S. Cl.
CPC .............. *G02B 1/111* (2013.01); *C09D 5/006* (2013.01); *C09D 181/02* (2013.01); *C09D 185/00* (2013.01)

(58) Field of Classification Search
CPC ...... G02B 1/111; G02B 6/138; G02B 6/1221; C09D 5/006; C09D 181/02; C09D 185/00
See application file for complete search history.

(56) References Cited

U.S. PATENT DOCUMENTS

| | | |
|---|---|---|
| 6,265,708 B1 | 7/2001 | Tanaka et al. |
| 2003/0189758 A1 | 10/2003 | Baer et al. |

(Continued)

FOREIGN PATENT DOCUMENTS

WO    WO-2018/183702 A1    10/2018

OTHER PUBLICATIONS

Babaeian, et al., "Nonlinear optical properties of chalcogenide hybrid inorganic/organic polymers (CHIPS) using the Z-scan technique", Optical Materials Express 2510, vol. 8, No. 9, Sep. 1, 2018.

(Continued)

*Primary Examiner* — Andrew J. Oyer
(74) *Attorney, Agent, or Firm* — Foley & Lardner LLP

(57) ABSTRACT

The present invention provides certain CHIP films and coatings, as well as the preparation and uses thereof. Chalcogenide hybrid organic/inorganic polymers or CHIPs may be suitable for use in antireflection coatings for use with infrared optics, for example as applied to lenses for infrared cameras. The coatings may be applied with spin coating and have a thickness related to the quarter wavelength of the desired infrared wavelengths.

19 Claims, 9 Drawing Sheets

(51) Int. Cl.
*C09D 181/02* (2006.01)
*C09D 185/00* (2006.01)

(56) References Cited

U.S. PATENT DOCUMENTS

| | | |
|---|---|---|
| 2010/0253600 A1 | 10/2010 | Seder et al. |
| 2015/0192707 A1 | 7/2015 | Ehrensperger et al. |
| 2018/0105649 A1* | 4/2018 | Pyun .................... C01B 3/042 |
| 2018/0208686 A1 | 7/2018 | Pyun et al. |
| 2018/0223034 A1* | 8/2018 | Char .................... C08G 75/14 |

OTHER PUBLICATIONS

Babaeian, et al., "Nonlinear optical properties of chalcogenide hybrid inorganic/organic polymers (CHIPs) using the Z-scan technique," Optical Materials Express, 2018, vol. 9, pp. 2510-2519.

Hedayati, et al., "Antireflective Coatings: Conventional Stacking Layers and Ultrathin Plasmonic Metasurfaces, A Mini-Review," Materials, 2016, vol. 9, No. 497, 22 pages.

International Search Report and Written Opinion in International Patent Application No. PCT/US2019/054084 dated Jan. 2, 2020 (9 pages).

International Search Report and Written Opinion in International Patent Application No. PCT/US2019/054368 dated Apr. 22, 2020 (12 pages).

* cited by examiner

Layer thickness vs. spin speed – average of 3 measurements

| Revolutions per minute | Average thickness (nm) |
|---|---|
| 1K | 370nm |
| 1.5K | 346 nm |
| 2K | 262 nm |
| 2.5K | 239 nm |
| 2.75K | 246 nm |
| 3K | 252 nm |
| 4K | 276 nm |
| 5K | 220 nm |
| 6K | 234 nm |
| 7K | 224 nm |

Poly(sulfur-r-diisopropenylbenzene) (50:50)
Native Silicon

CHALCOGENIDE HYBRID ORGANIC/INORGANIC POLYMERS FILMS AND COATINGS AND THE USE THEREOF

CROSS-REFERENCE TO RELATED APPLICATIONS

This application is a U.S. National Stage Application under 35 U.S.C. § 371 of International Application No. PCT/US2019/054084, filed on Oct. 1, 2019, which claims the benefit of and priority to U.S. Provisional Patent Appl. No. 62/740,372, filed on Oct. 2, 2018, the entire disclosures of which are hereby incorporated by reference for any and all purposes.

GOVERNMENT SUPPORT

This invention was made with government support under Grant No. 1607971 awarded by National Science Foundation (NSF). The government has certain rights in the invention.

FIELD OF THE INVENTION

The present invention is directed to polymeric materials, the use thereof, and the preparation thereof.

DESCRIPTION

Antireflective (AR) coatings are applied to many optical surfaces to reduce the reflection of incident light for such purposes as increasing system efficiency or appearance. Example applications include lenses, structural glass, displays, or multilayer optical systems. AR coatings exploit the difference in the index of refraction between the media above and below the layer together with an optimum thickness of the coating, typically one quarter of the desired transmitted wavelength divided by the refractive index of the coating, to result in destructive interference of light reflected at the top surfaces of the coating and of the substrate, while more of the desired light spectrum passes through the coating to the substrate, resulting in increased light intensity transmitted to the substrate. For a substrate with refractive index $n_{sub}$, the refractive index for an optimal single layer AR coating for light incident from air is $(n_{sub})^{0.5}$. For silicon, where $n_{sub}=3.5$ in at technologically significant wavelengths such as 1550 nm, the ideal single-layer AR coating refractive index 1.871. AR coatings may be comprised of single or multiple layers, or may comprise textured layers. Typical AR coatings comprise thin films of inorganic oxides, which may be applied by an often expensive and difficult vapor-deposition process. In some embodiments, AR coatings may have a thickness of being one-quarter of the ratio of the wavelength of the incident light divided by the refractive index of the coating. Further, the AR coatings may have a thickness in the range of 0.1 to 0.4 of the ratio of at least 25% of the range of the wavelengths of the incident light divided by the refractive index of the coating.

In some embodiments, the AR coatings may have a thickness in the range of 0.2 to 0.3 of the ratio of at least 25% of the range of the wavelengths of the incident light divided by the refractive index of the coating.

In some embodiments, the AR coatings may have a thickness in the range of 0.2 to 0.3 of the ratio of about 25% of the range of the wavelengths of the incident light divided by the refractive index of the coating.

The invention uses Chalcogenide Hybrid Inorganic/Organic Polymers (CHIP) to form an anti-reflective (AR) coating on high refractive index substrates. In preferred embodiments, CHIP coatings on substrates form an AR coating for the near (NIR) and short wave infrared light (SWIR) (between approximately 700 nm-3000 nm). This coating is designed in such a way that light in the NIR and SWIR spectrum exhibits reduced reflection when entering the substrate. The coating is applied to the substrate in a thin layer using solution chemistry processing, typically by spin coating or dip coating.

Anti-Reflective Coating for Photonic Materials as Devices Using Chalcogenide Hybrid Organic/Inorganic Polymers The inventors discovered the use of high refractive index polymers based on Chalcogenide Hybrid Organic/Inorganic Polymers (CHIPs) as anti-reflective coatings for a number of high refractive index inorganic transmissive materials operating in the near and short wave Infrared regions (NIR & SWIR). Anti-reflective coatings for these important technological wavelengths typically require vapor-deposition processing of inorganic coatings, using processes such as thermal evaporation, sputtering or chemical vapor deposition. The invention encompasses simple spin coating methods of CHIPs anti-reflective coatings on substrate surfaces, including silicon, glass, and other inorganic transmissive components, and optical device components.

One aspect of the invention pertains to the use of high refractive index polymers based on Chalcogenide Hybrid Organic/Inorganic Polymers (CHIPs) as anti-reflective (AR) coatings for high refractive index inorganic transmissive materials, such as germanium, silicon, or zinc selenide, with the thickness of the antireflection coating being one-quarter of the ratio of the wavelength of the incident light divided by the refractive index of the coating, wherein for light in the NIR and SWIR spectrum the AR coating increases the amount of NIR and SWIR light to transmit through the coating relative to other wavelengths.

In particular, the invention encompasses the use of one or more CHIPs to form an anti-reflective (AR) coating for the near (NIR) and short wave infrared light (SWIR), with the thickness of the antireflective coating being one-quarter of the ratio of the wavelength of the incident light divided by the refractive index of the coating. Traditionally, anti-reflective coatings for these important technological wavelengths require vapor-deposition processing of other inorganic coatings. In contrast, CHIP anti-reflective coatings may be applied to substrates using simpler and less expensive methods, such as spin-coating or dip-coating. In further embodiments, the invention encompasses spin coating CHIPs anti-reflective coatings on surfaces such as silicon surfaces as well as inorganic transmissive, or optical device components for near infrared light, short-wave infrared light, and mid-wave infrared light (700 nm-5000 nm) comprising one or more chalcogenide hybrid organic/inorganic polymers (CHIPS), where the antireflective coating is applied to a high refractive index infrared optical material such as germanium, silicon, or zinc selenide, with the thickness of the antireflection coating being one-quarter of the ratio of the wavelength of the incident light divided by the refractive index of the coating.

Without wishing to limit the invention to a particular theory or mechanism, these optical coatings are based on the refraction of light, which results in reflection at the interface between two materials with different refractive indices. AR coatings are based on achieving destructive interference between two reflections: (1) the reflection from the interface between the incident medium (e.g. air, insert gas, vacuum)

and the AR coating, and (2) the reflection from the interface between the AR coating and the underlying substrate. When the optical path length difference between these two reflections is equal to the incident wavelength divided by two, the two reflections cancel, reducing reflected light in the desired wavelength band.

One aspect of the invention pertains to an antireflective coating for near infrared light (NIR) (700-1000 nm), short-wave infrared light (SWIR) (700-2500 nm), and mid-wave infrared light (MWIR) (3-5 microns)) comprising one or more CHIPS, where the antireflective coating is applied to a high refractive index infrared optical material such as germanium, silicon, or zinc selenide, with the thickness of the antireflection coating being one-quarter of the ratio of the wavelength of the incident light divided by the refractive index of the coating. In some embodiments, the coating allows light in the infrared (IR) spectrum to preferentially transmit through the coating relative to other wavelengths of light, which are reflected more than the IR wavelengths. Without wishing to limit the invention to a particular theory or mechanism, one objective is not to reflect other wavelengths.

In some embodiments, the invention encompasses a method of applying an AR coating to a substrate comprising contacting said coating with said surface of said substrate. The coating may be applied to the substrate in a thin layer using solution chemistry processing. Furthermore, the coating may be applied to said surface by spin coating. The substrate may be chosen from glass, a silicon surface, a germanium surface, an inorganic transmissive device component, or optical device component.

In further embodiments, the invention encompasses a method of applying an AR coating to a substrate comprising contacting said coating with said surface of said substrate, wherein said coating is applied via chemical processing, wherein the precursor chemical, that which becomes the thin layer, is in solution and when it is applied to a surface a chemical change occurs and a layer is left behind. The solution may be applied by dipping, spin coating, and/or spraying.

Another aspect of the invention pertains to a high refractive index inorganic transmissive material operating in the near and short-wave infrared regions (NIR through MWIR) comprising an antireflective coating of the invention.

The invention also encompasses applying the anti-reflective coatings described herein to the surfaces of components of various devices, such as night vision goggles or optical equipment; camera lenses; LCD screens; laser optics, etc.

A further embodiment of the invention encompasses an optical system in a camera, wherein one or more components of the optical system comprises an AR coating of the invention. In some embodiments, the optical system is part of a smart device. In some embodiments the optical system is part of an automobile or other vehicle.

A further embodiment of the invention encompasses a lens comprising an AR coating of the invention.

A further embodiment of the invention encompasses an eyeglass lens comprising an AR coating of the invention.

A further embodiment of the invention encompasses a watch comprising an AR coating of the invention.

A further embodiment of the invention encompasses a binocular comprising an AR coating of the invention.

A further embodiment of the invention encompasses a window comprising an AR coating of the invention.

A further embodiment of the invention encompasses a transparent fixture comprising an AR coating of the invention.

A further embodiment of the invention encompasses antireflective coating as shown in FIG. 1.

A further embodiment of the invention encompasses using spin coating as shown in FIG. 2.

Chalcogenide Hybrid Inorganic/Organic Polymers (CHIP)

In some embodiments, CHIP is prepared from one or more chalcogenic monomers. The chalcogenic monomer may be selected from a group consisting of elemental sulfur, a liquid polysulfide, an oligomer containing sulfur, and an oligomer containing sulfur and selenium units. In further embodiments, the chalcogenic monomers may comprise sulfur monomers derived from elemental sulfur, and elemental selenium ($Se_8$) or selenium sulfide, or a combination thereof.

In further embodiments, the chalcogenic monomers may comprise one or more cyclic selenium sulfide monomers having the formula $Se_nS_{(8-n)}$. In another embodiment, the cyclic selenium sulfide monomers can include any isomer of the formula. In some embodiments, n in an integer that can range from 1 to 7. For example, when n=2, the cyclic selenium sulfide monomers have the formula $Se_2S_6$. As another example, when n=3, the cyclic selenium sulfide monomers have the formula $Se_3S_5$. Preferably, the one or more cyclic selenium sulfide monomers can comprise all possible isomers of a specific formula. In alternative embodiments, the selenium sulfide monomers can be of the formula $Se_nS_m$, wherein n ranges from 1 to 7 and m ranges from 1 to 7, wherein the selenium sulfide monomers are not necessarily cyclic. In one embodiment, assuming that n=7, i.e. $Se_7S$, then the cyclic selenium sulfide monomers may comprise at most about 70 wt % of selenium.

In some embodiments, the CHIP may comprise one or more sulfur monomers derived from elemental sulfur at a level of at least 35 wt % of the CHIP, elemental selenium ($Se_8$) at a level of at least 35 wt % of the CHIP, and one or more comonomers each selected from a group consisting of amine comonomers, thiol comonomers, sulfide comonomers, alkynylly unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, and monomers having at least one isopropenyl moiety, at a level in the range of about 5-50 wt % of the CHIP.

In one embodiment, for example, the CHIP may comprise at least about 50 wt % of the sulfur monomers. In another embodiment, the CHIP may comprise at least about 50 wt % of $Se_8$. In a further embodiment, the CHIP may comprise about 35-50 wt % of sulfur monomers, about 35-50 wt % of elemental selenium, and about 15-25 wt % of the comonomers.

In some embodiments, any of the CHIP described herein may further comprise at least about 35 wt % of chalcogenic monomers. In other embodiments, the chalcogenic monomers can be in a range of about 35 to 50 wt %, or about 50 to 60 wt %, or about 60 to 70 wt %, or about 70 to 80 wt %, or about 80 to 99 wt % of the CHIP.

In other embodiments, the CHIP may comprise one or more chalcogenic monomers at a level of at least 35 wt % of the CHIP, and one or more one or more triazine and/or phosphazene moieties, at a level in the range of about 5-50 wt % of the CHIP. In one embodiment, the chalcogenic monomers may comprise elemental sulfur, a liquid polysulfide, a liquid chalcogenide polymer, an oligomer containing sulfur, an oligomer containing sulfur and selenium units, or a combination thereof.

In one embodiment, any of the CHIP may comprise one or more cyclic selenium sulfide monomers at a range of about 5 to 10 wt %, or about 10 to 20 wt %, or about 20 to 30 wt %, or about 30 to 40 wt %, or about 40 to 50 wt %, or about 50 to 60 wt %, or about 60 to 70 wt % of the CHIP. In another embodiment, the cyclic selenium sulfide monomers may comprise selenium units of at most about 20 wt %, or at most about 30 wt %, or at most about 40 wt % or at most about 50 wt %, or at most about 60 wt %, or at most about 70 wt % of the cyclic selenium sulfur monomers. In a further embodiment, the cyclic selenium sulfide monomers comprises at most about 70 wt % of selenium.

In some embodiments, any of the CHIP may further comprise about 5-50 wt % of chalcogenic monomers. In other embodiments, the chalcogenic monomers can be at a range of about 5 to 10 wt %, or about 10 to 20 wt %, or about 20 to 30 wt %, or about 30 to 40 wt %, or about 40 to 50 wt % of the CHIP.

In other embodiments, any of the CHIP described herein may comprise the one or more comonomers are at a range of about 5 to 10 wt %, or about 10 to 20 wt %, or about 20 to 30 wt %, or about 30 to 40 wt %, or about 40 to 50 wt % of the CHIP.

In other embodiments, any of the CHIP may further comprise about 5-50 wt % of elemental sulfur ($S_8$). In other embodiments, the elemental sulfur can be at a range of about 5 to 10 wt %, or about 10 to 20 wt %, or about 20 to 30 wt %, or about 30 to 40 wt %, or about 40 to 50 wt % of the CHIP.

In still other embodiments, any of the CHIP may further comprise about 5-50 wt % of elemental selenium ($Se_8$). In further embodiments, the elemental selenium can be at a range of about 5 to 10 wt %, or about 10 to 20 wt %, or about 20 to 30 wt %, or about 30 to 40 wt %, or about 40 to 50 wt % of the CHIP.

In some embodiments, any of the CHIP comprises at least about 50 wt % sulfur monomers. In other embodiments, the one or more comonomers are at a range of about 5 to 10 wt %, or about 10 to 20 wt %, or about 20 to 30 wt %, or about 30 to 40 wt %, or about 40 to 50 wt % of the CHIP. In still other embodiments, the CHIP may further comprise at least about 35 wt %, or at least about 40 wt %, or at least about 50 wt % of elemental selenium ($Se_8$).

CHIP and methods as disclosed in Int'l Appl. No. PCT/US18/25178; filed: Mar. 29, 2018, 2018 and U.S. Patent Publication No. US20180208686A1 are incorporated by reference to the extent they are consistent with the aspects of the invention described herein.

The following list of embodiments are mentioned by way of example:

1. An antireflective coating for near infrared light, short-wave infrared light, and mid-wave infrared light (700 nm-5000 nm) comprising one or more chalcogenide hybrid organic/inorganic polymers (CHIPS), where the antireflection coating is applied to a high refractive index infrared optical material such as germanium, silicon, or zinc selenide. The antireflection coating may have a thickness of being one-quarter of the ratio of the wavelength of the incident light divided by the refractive index of the coating, and, optimally, have a refractive index that is the square root of the underlying substrate index. For instance, the thickness of the antireflection coating may be the range 700 nm-5000 nm by 4 to get 174 nm-1250 nm) divided by the refractive index; for an optimal single-layer AR coating on silicon ($n_{sub}$=3.5) designed for operation at a wavelength of 1550 nm, the coating index should be 1.871 and it's thickness should be (1550 nm/4)/1.871=207 nm In many embodiments, the AR coating consists of a single layer.
2. The coating of embodiment 1, wherein light in the NIR and SWIR spectrum can pass through with high transmission while other wavelengths are reflected to a greater degree.
3. A method of applying a coating of embodiment 1 to a substrate comprising contacting said coating with said surface of said substrate.
4. The method of embodiment 3, wherein coating is applied to the substrate in a thin layer using solution chemistry processing.
5. The method of embodiment 3, wherein said coating is applied to said surface by spin coating.
6. The method of embodiment 3, wherein said substrate is glass, a silicon surface, a germanium surface, an inorganic transmissive device component, or optical device component.
7. The method of embodiment 3, wherein said coating is applied via chemical processing, wherein the precursor chemical, that which becomes the thin layer, is in solution and when it is applied to a surface a chemical change occurs and a layer is left behind.
8. The method of embodiment 7 wherein said solution is applied by dipping, spin coating, and/or spraying.
9. A high refractive index inorganic transmissive material operating in the near and short-wave infrared regions (NIR through MWIR) comprising an antireflective coating of embodiment 1.
10. An optical system in a camera, wherein one or more components of the optical system comprises the coating of embodiment 1. In some embodiments the optical system is part of an automobile or other vehicle.
11. A lens comprising the coating of embodiment 1.
12. An eyeglass lens comprising the coating of embodiment 1.
13. A watch comprising the coating of embodiment 1.
14. A binocular comprising the coating of embodiment 1.
15. A window comprising the coating of embodiment 1.
16. A transparent fixture comprising the coating of embodiment 1.
17. An antireflection coating as shown in FIG. 1.
18. A spin coating a shown in FIG. 2.

Definitions

As used herein, sulfur can be provided as elemental sulfur, for example, in powdered form. Under ambient conditions, elemental sulfur primarily exists in an eight-membered ring form ($S_8$) which melts at temperatures in the range of 120° C.-130° C. and undergoes an equilibrium ring-opening polymerization (ROP) of the $S_8$ monomer into a linear polysulfane with diradical chain ends. As the person of skill in the art will appreciate, while $S_8$ is generally the most stable, most accessible and cheapest feedstock, many other allotropes of sulfur can be used (such as other cyclic allotropes, derivable by melt-thermal processing of $S_8$). Any sulfur species that yield diradical or anionic polymerizing species when heated as described herein can be used in practicing the present invention.

The term "CHIP" is used herein to refer to a chalcogenide hybrid inorganic/organic polymer.

The term "CHIP" is used herein interchangeably with "chalcogenlde hybrid inorganic/organic polymer."

As used herein, the term "chalcogenide" refers to a compound containing one or more chalcogen elements. One of ordinary skill in the art will understand that the classical chalcogen elements are sulfur, selenium and tellurium. In accordance with the present invention, the use of chalcogenide also refers to compounds and/or polymers containing selenium.

As known to one of ordinary skill in the art, the term "isomer" refers to compounds having the same formula but differ in arrangement. For instance, isomers of cyclic selenium sulfides, such as $Se_2S_6$ and $Se_3S_5$, can have different placements of the Se units in the ring (e.g., S—Se—Se—S or S—Se—S). Isomers of $Se_2S_6$ include 1,2-isomers, 1,3-isomers, 1,4-isomers, and 1,5-isomers, wherein the numbers refer to the position of the Se units in the eight-membered ring.

As known to one of ordinary skill in the art, the term "visible" refers to a portion of the electromagnetic spectrum that falls in the range of 390 to 700 nm. As used herein, the term "infrared" (IR) refers to a portion of the electromagnetic spectrum that falls in the range of 700 nm to 1 mm. Subsets of the IR spectrum include near-IR (700 nm to 3 μm), mid-IR (3-8 μm), long-wavelength IR (8-15 μm) and far-IR (15 μm to 1 mm).

As used herein, the terms "those defined above" and "those defined herein" when referring to a variable incorporates by reference the broad definition of the variable as well as any narrow and/or preferred, more preferred and most preferred definitions, if any.

As used herein, the term "about" refers to plus or minus 10% of the referenced number.

As used herein, the term "infrared" (IR) refers to a portion of the electromagnetic spectrum that falls in the range of 700 nm to 1 mm. Subsets of the IR spectrum include near-IR (700 and 1,100 nanometers), shortwave IR (SWIR) (1,100 and 3,000 nanometers), mid-IR (3-8 μm), long-wavelength IR (8-15 μm) and far-IR (15 μm to 1 mm).

An antireflective or anti-reflection (AR) coating is a type of optical coating applied to the surface of lens and other optical elements or surfaces to reduce reflection.

"A smart device" is an electronic device, generally connected to other devices or networks via different wireless protocols such as Bluetooth, NFC, Wi-Fi, LiFi, 3G, 4G, 5G, etc., that can operate to some extent interactively and autonomously. Several notable types of smart devices are smartphones, phablets and tablets, smartwatches, smart bands, smart key chains and smart speakers. The term can also refer to a device that exhibits some properties of ubiquitous computing, including artificial intelligence (AI).

The term "material" as herein refers to any substrate on which the coating of the invention can adhere. For example, glass, a high refractive index infrared optical material (such as germanium, silicon, or zinc selenide). It includes transmissive materials, generally.

The term "CHIP polymer (ic) material" as used herein refers generally to organic/inorganic polymeric materials comprised of chalcogen units (e.g., S, Se) and organic comonomers.

The term "broad band infrared reflective coating" refers to a coating that can reflect infrared light over a band spanning from 50 to 500 nm.

BRIEF DESCRIPTION OF THE DRAWINGS

The features and advantages of the present invention will become apparent from a consideration of the following detailed description presented in connection with the accompanying drawings in which.

EXAMPLES

Example 1

Figure 1:
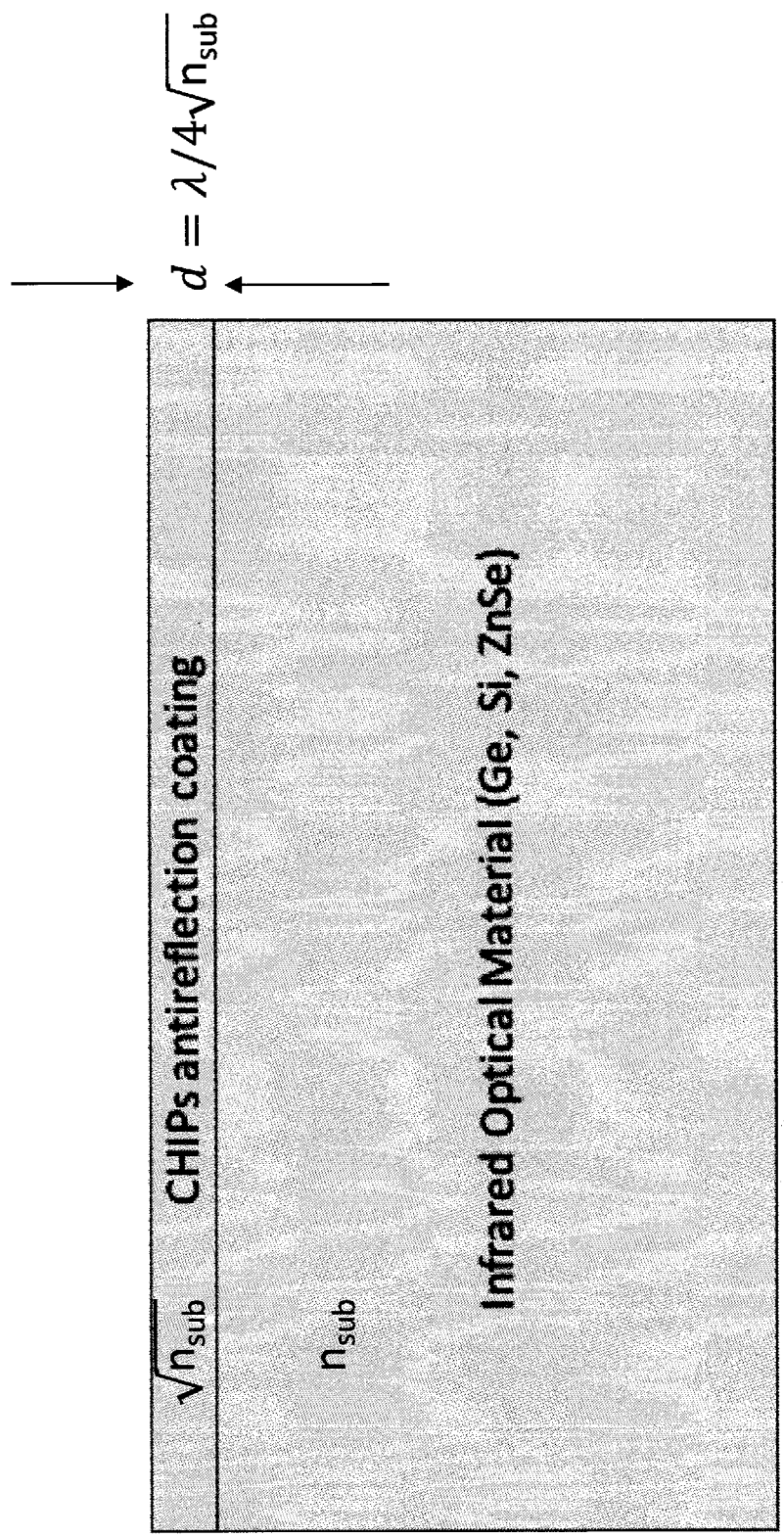
FIG. 1 shows CHIPs antireflection coating on an infrared optical material (comprising Ge, Si, ZnSe), an exemplary embodiment of a transmissive surface. In some embodiments, the transmissive surface may be glass or any other surface to which the coating can adhere.
Figure 2:
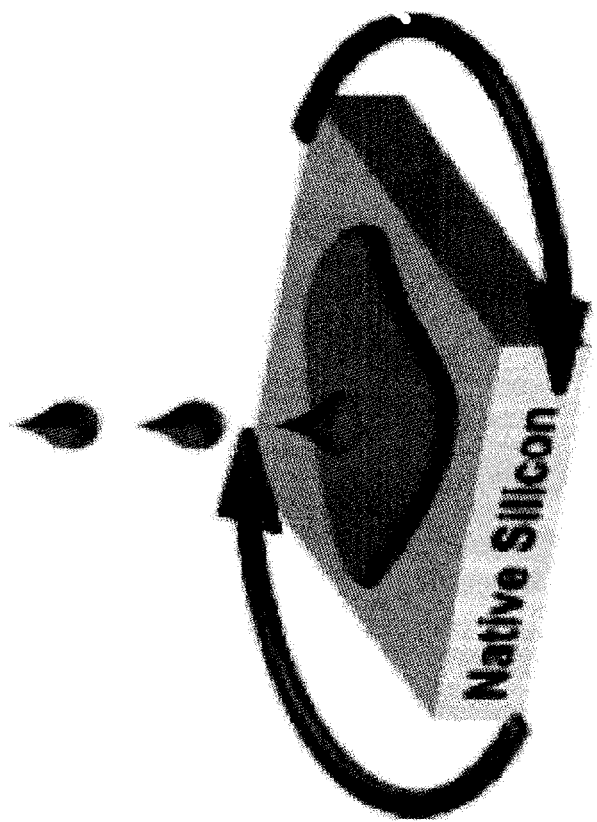
FIG. 2 shows spin coating process for depositing CHIPs anti-reflection coating. The liquid coating material is applied to a substrate (such as native silicon), which is then spun at a high rate of speed to achieve a uniform thin film. The higher the spin speed the thinner the resulting film.

Preparation of poly(sulfur-random-selenium-random-1,3 diisopropenylbenzene)(poly(S-r-Se-r-DIB)) terpolymers To a 11 mL glass vial equipped with a magnetic stir bar was added sulfur (S8, 1.5 g, 46.78 mmol) and heated to T=160° C. in a thermostated oil bath until a clear orange colored molten phase was formed. The vial was then transferred to an adjacent T=150° C. in a thermostated oil bath where selenium (Se, 0.6 g, 7.59 mmol) was then directly added to the molten sulfur medium. 1,3-Diisopropenylbenzene (DIB, 0.9 g (0.97 mL)) was then directly added to the molten sulfur-selenium medium via syringe. The resulting mixture was stirred at T=150° C. for 1 to 1½ hours, which resulted in vitrification of the reaction media. The product was then taken directly from the vial using a metal spatula and removal of the magnetic stir bar for determination of yields after allowing the reaction mixture to cool to room temperature.

Example 2 (Preparation of AR Coating, Generally)

Overview

The simplest AR Coating is one that consists of a single thin layer whose thickness is one quarter the wavelength where AR is desired, divided by the refractive index of the AR coating. The reflection is minimized when the index of refraction of the AR is sqrt (ns), where ns is the substrate index, if the incident medium is air. Therefore, for high index materials (e.g., Si, Ge, etc.) a good AR coating is one with high index with the substrate.

For example, it was found that using silicon for the substrate, with an n of 3.48 at 1554 nm, and poly(sulfur-r- diisopropenylbenzene)(poly(s-r-DIB)) for the AR coating, with an n of 1.719 at 1554 nm; the square root of the refractive index of Silicon (1.865) closely matches that of poly(S-DIB) film making it a good candidate for single film AR coatings on silicon.

Preparation of Substrate

Silicon wafer (100 mm diameter, P type/Boron doped, 1-0-0 orientation, 1-20 ohm-cm resistivity, 525±25 µm thick, Prime grade, Single side polished, 2 SEMI FLATS) was cleaved along the crystalline axes using a diamond tip scribe pen into a 1 inch×1 inch sample.

Sample was cleaned using Acetone/IPA rinse (rinsed with acetone, blow dried with nitrogen, rinsed with IPA, blow dried with nitrogen) until the sample visually looks free of any debris or dust.

Sample was placed in Oxygen Plasma Cleaner (Plasma-Preen Plasma Cleaning/Etching System) under vacuum (−25 kPa) with oxygen (<5 scfh) for 5 minutes.

Preparation of Polymer Solution

50/50 S-DIB was synthesized using inverse vulcanization process yielding a glassy red polymer.

The polymer was crushed into fine powders using a mortar and pestle.

1 g of this powder was precisely weighed using a weighing scale and added to a glass vial (25 ml capacity).

8 mL of chlorobenzene was measured and added with a syringe to the glass vial containing 50/50 S-DIB.

A small magnetic stir bar was added to the vial as well.

The glass vial containing the polymer and solvent was kept on a preheated hotplate at 115° C. while closing the cap.

The solution was allowed to mix for ~15 minutes at 115° C. with 500 rpm stirring, until all the polymer is dissolved in the solvent.

The final solution is a red colored homogeneous solution, which is then allowed to cool down to room temperature.

Preparation of AR Coatings

The clean silicon sample is placed on the vacuum chuck of the Laurell spin coater. The spin process used is as follows:

Step1—500 rpm rotation/5 secs,
Step2—3000 rpm*/30 secs

Polymer solution was filled in a 3 ml syringe. Any air bubbles in the syringe was removed. A 0.2 µm pore size, 13 mm diameter, PTFE membrane syringe filter was screwed on the syringe. The syringe was turned upside down to let the air bubbles come to the top and was passed through the syringe. Some liquid was passed through to wet the membrane and to get rid of any remaining air bubbles.

Polymer was dispensed on the center of the substrate until the solution fills ⅔rd of the substrate.

Spinner was turned on to allow the film to uniformly cover the substrate. Spinning at high speed also evaporates the solvent out of the film. The spin process used is as follows:

Step1—500 rpm rotation/5 secs,
Step2—3000 rpm*/30 secs.

*Varying spin speed were used to obtain different thicknesses of the films (220-370 nm)

The spun film was checked for uniformity and the sample was placed on a preheated hotplate at 130° C. for 3 mins to get rid of any remaining solvent in the film.

After 3 minutes, sample was taken off the hotplate resulting in a uniformly thin S-DIB coating on silicon substrate.

Example 3

Figure 3:
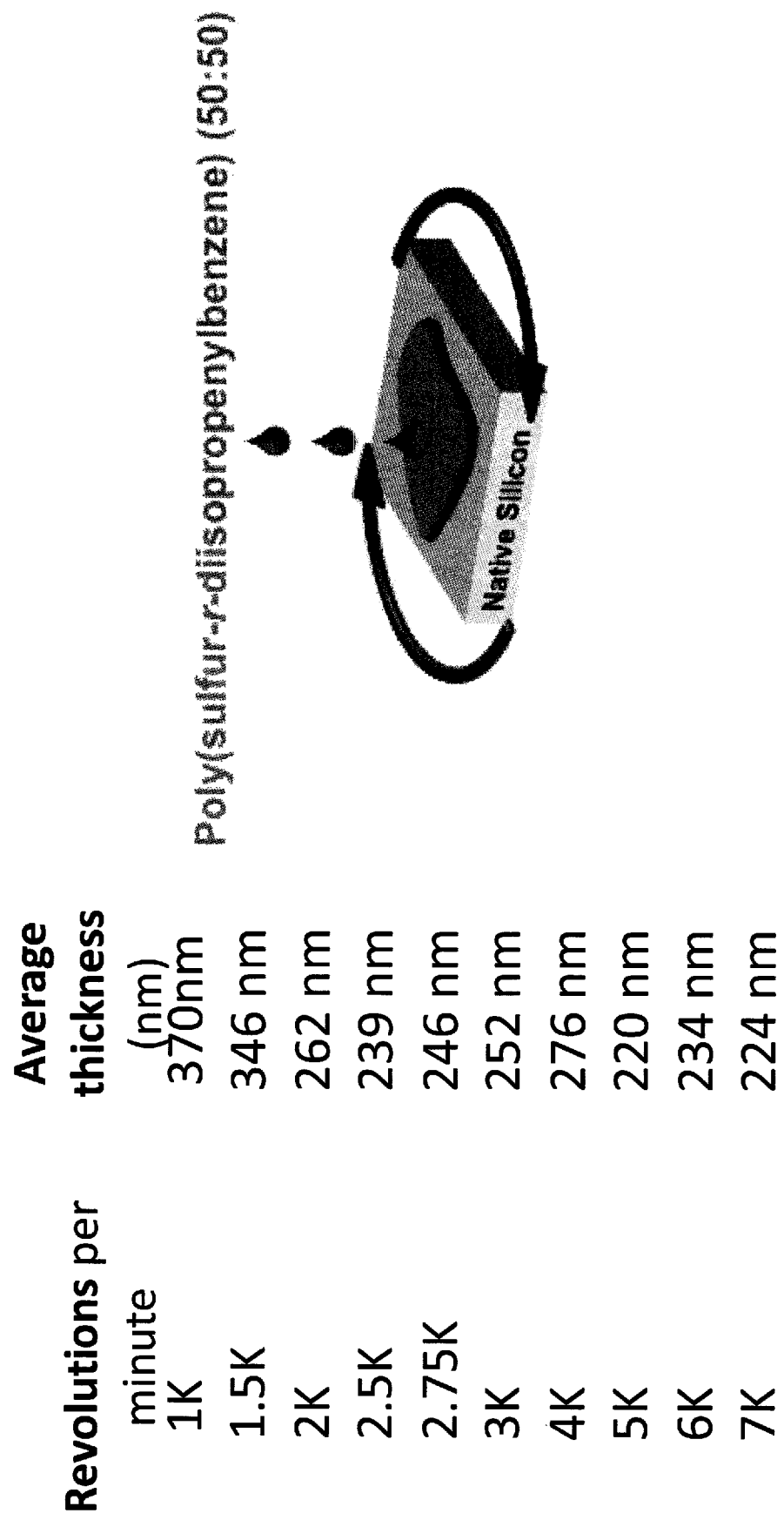
FIG. 3 shows the thickness of the spun coat AR film as a function of the spin-coating speed, for the poly (S-r-DIB) 50/50 copolymer in solution

The data in FIG. 3 was generated using the following procedure:

Film thickness was measured using Dektak which measures the variation in film thickness using stylus profilometry. The film is scanned over the set distance and set time, using a stylus capable of measuring film uniformity by tracking the motion of the cantilever and monitoring the force applied on the stylus. Two scratches were created on the sample, removing the film and exposing the bare polished Si. This creates a geometry where the base is the Si substrate, and there is a platform existing as tall as the film. A stylus can then probe over the grooves, tracking the region with no film and then goes over to the film and then back to no film. The film height can then be derived by the difference in z values between the base Si substrate and the S-r-DIB platform. The process was repeated at 3 different positions on the sample and the measurement was averaged. The resulting film thickness is an average of the three points.

Example 4

Figure 4:
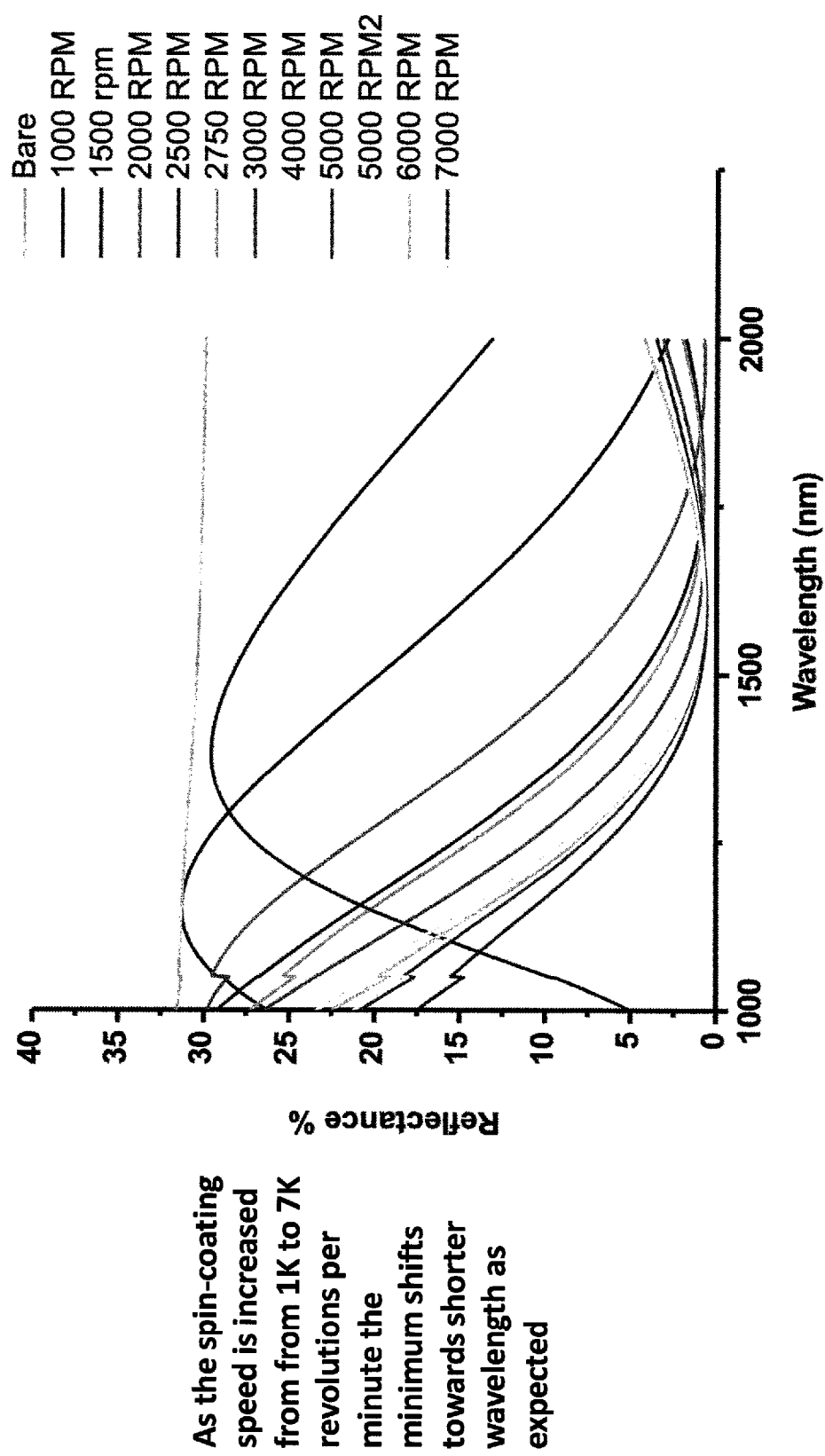
FIG. 4 shows Reflectance spectrum of silicon wafer coated with varying thicknesses of poly (S-r-DIB)
Figure 5:
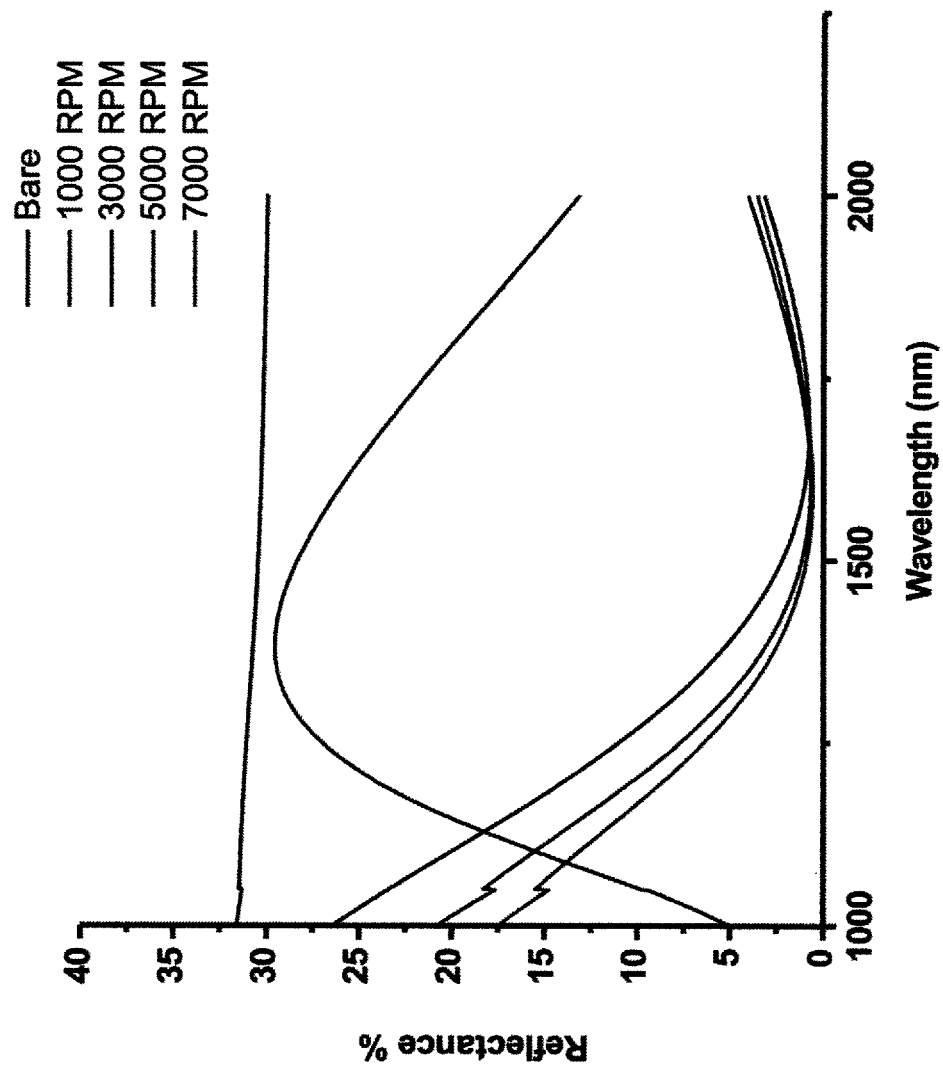
FIG. 5 shows Reflectance spectrum of silicon wafer coated with varying thicknesses of poly (S-r-DIB). Same as FIG. 6, but now just showing a few of the results and better evidencing the thickness dependence of the antireflection coating effectiveness.
Figure 6:
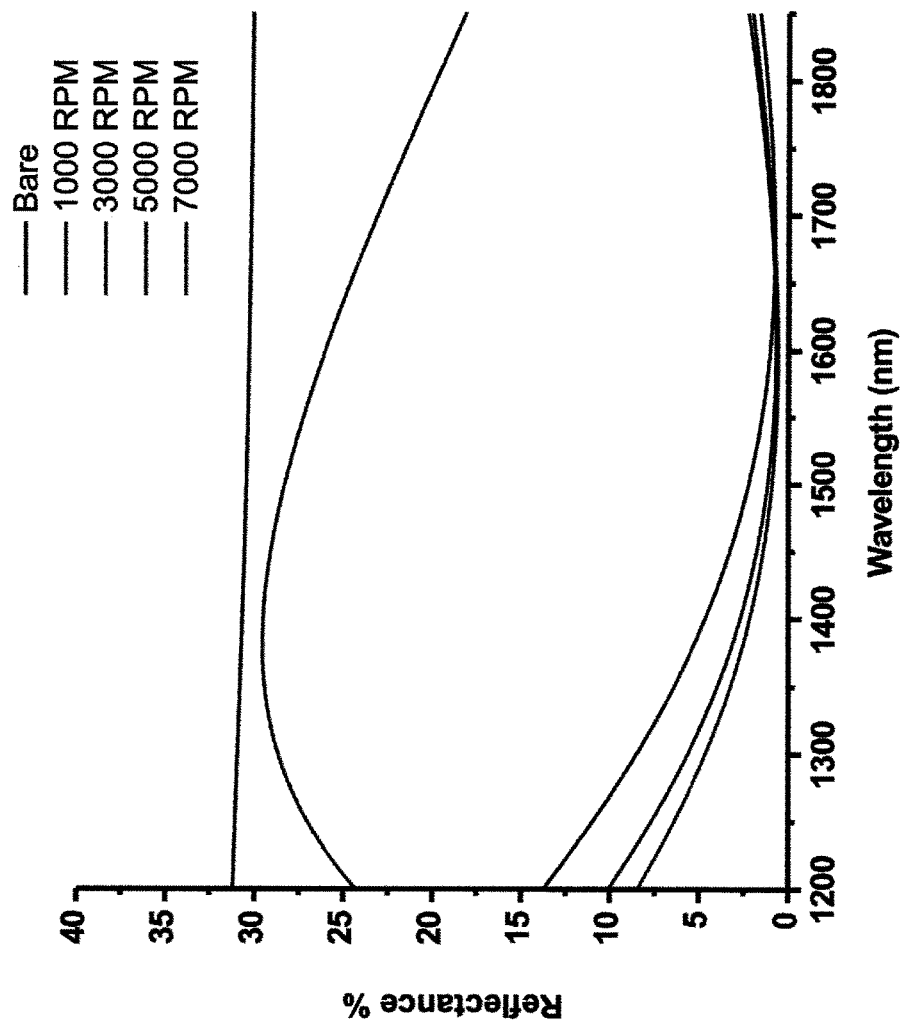
FIG. 6 shows Reflectance spectrum of silicon wafer coated with varying thicknesses of poly (S-r-DIB). Same as FIG. 6 but using a different scale on the x-axis.

The data in FIGS. 4, 5, and 6 was generated using the following procedure:

The performance of the anti-reflection coating was verified using a Cary 7000 UV-Vis-NIR spectrophotometer. The Cary Universal Measurement Accessory (UMA) proved to be a useful tool in taking these measurements. The UMA allows the user to control the orientation of the sample relative to the input beam, and the position of the detector in relation to the sample. In our case, the coated Si sample was oriented at 5.5° from the input beam, and the detector was located at position 11°. The angle of 5.5° was used on the sample under test so that the input beam was as close to normal as possible on the sample without being blocked by the detector that would measure the reflected light. The detector was oriented at 11° in order to collect the specularly reflected light that would naturally result from Fresnel reflection of the silicon.

Before each measurement, a baseline using air was taken using the spectrometer. This ensured that an accurate reflection spectrum of the sample would be measured. Unpolarized light was used in this application. The polished side of the Si wafer was AR coated, and this side faced the incoming light. The backside was not polished, and light transmitted through the Si sample would scatter and not interfere with the collected reflection data. Measured data demonstrated a dramatic decrease in Fresnel reflection on the Si substrate due to the Quarter Wave Anti Reflection coating. The plot contains the S-r-DIB films with varying thicknesses, resulting in different spectral reflectance dependence. For reference, silicon substrate with no film was used which shows typical ~30% reflectance off the surface. Adding the AR coating on the surface reduces this reflectance to less than 1% which demonstrates the excellent performance of the AR coatings. Adding multiple layers of the S-r-DIB film will lead to reducing the reflectance even further down.

Example 5

Figure 7:
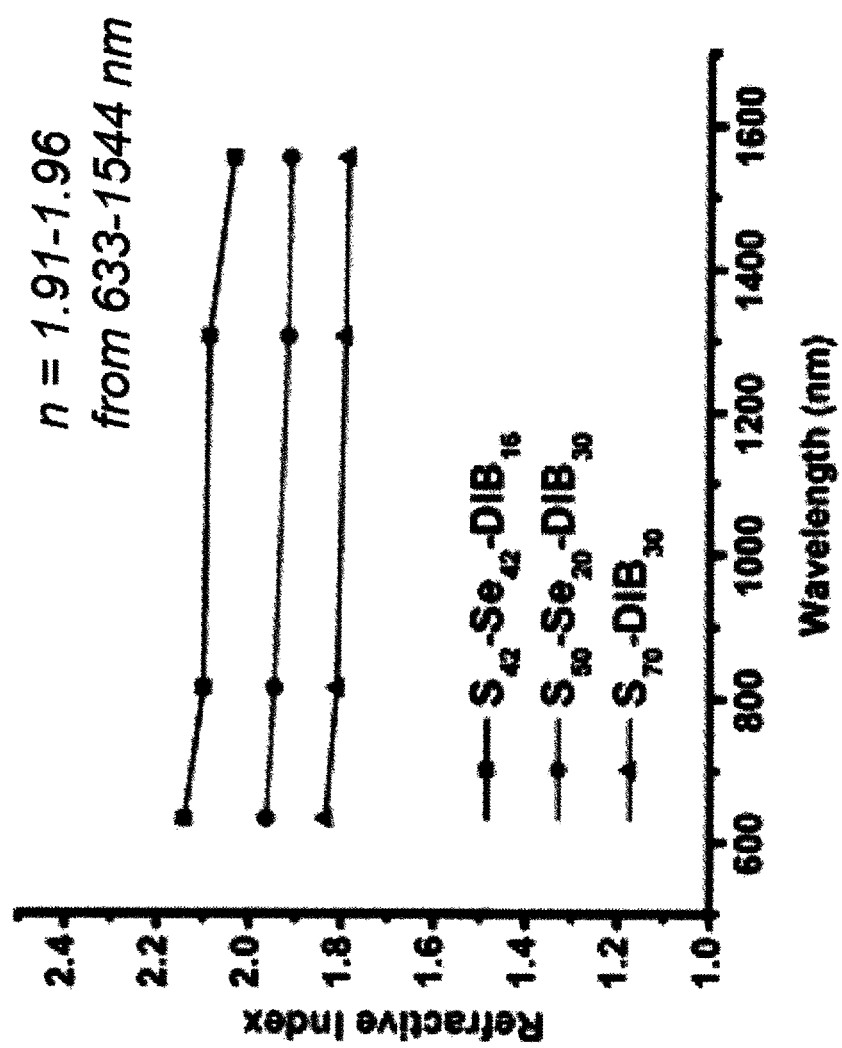
FIG. 7 shows a plot of refractive index vs. wavelength for the CHIPs terpolymers having varying S/Se compositions.

The data in FIG. 7 was generated using the following procedure:

Refractive index of the different polymers were measured using the Metricon Prism coupler.** The exact theory of measurement can be found in this link below https://www.metricon.com/model-2010-m-overview (last visited Sep. 30, 2019, which is incorpooraated by reference; see below for excerpt)

The instrument contains four different lasers with wavelengths 633 nm, 816 nm, 1305 nm, and 1554 nm. The S-DIB and other polymers were melt casted and used for measurement using the process described above. The index was measured in bulk mode for different wavelengths.

Theory of Measurement (excerpt from https://www.metricon.com/model-2010-m-overview (last visited Sep. 30, 2019, which is incorporated by reference)**

Figure 8:
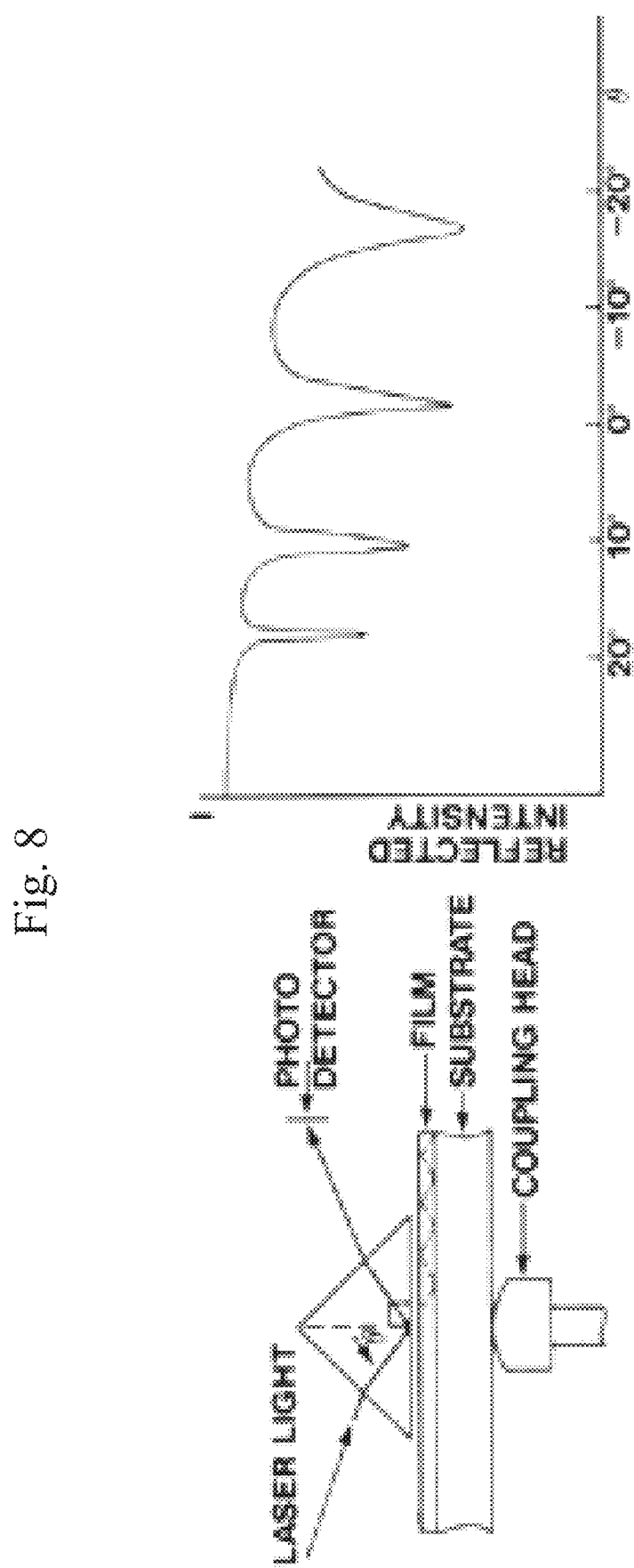
FIG. 8 shows the measurement principle for thin film (Diagram A).

The sample to be measured is brought into contact with the base of a prism by means of a pneumatically-operated coupling head, creating a small air gap between the film and the prism (see FIG. 8; diagram A). A laser beam strikes the base of the prism and is normally totally reflected at the prism base onto a photodetector. At certain discrete values of the incident angle, called mode angles, photons can tunnel across the air gap into the film and enter into a guided optical propagation mode, causing a sharp drop in the intensity of light reaching the detector:

To a rough approximation, the angular location of the first mode (dip) determines film index, while the angular difference between the modes determines the thickness, allowing thickness and index to be measured completely independently.

Measurements are made using a computer-driven rotary table which varies the incident angle, and locates each of the film propagation modes automatically. As soon as two of the mode angles are found, film thickness and index can be calculated. The entire measurement process is fully automated and requires approximately twenty seconds.

The number of modes supported by a film of given index increases with film thickness. For most film/substrate combinations, a thickness of 100-200 nm is required to support the first mode, while films in the one-micron range can support as many as four or five modes. If the film is thick enough to support two or more propagation modes (typically 300-500 nm), the Model 2010/M calculates thickness and index for each pair of modes, and displays the average and standard deviation of these multiple estimates.

The standard deviation calculation, unique to the prism coupling technique, is an indication of measurement self-consistency and a powerful means of confirming the validity of the measurement.

Measurements of thickness and index can be made on most samples with thickness up to 10-15 microns. For thickness above 15 microns, index is still measurable using the bulk measurement technique (see below) although thickness and index for many samples is often measurable at thicknesses up to 150-200 microns.

Figure 9:
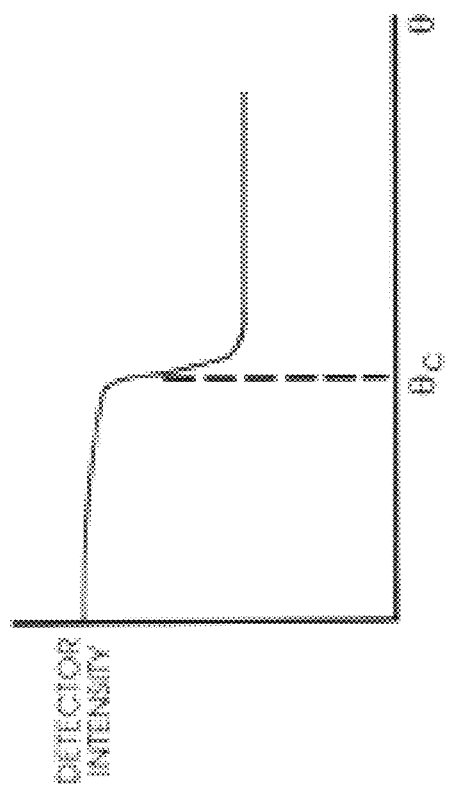
FIG. 9 shows the measurement principle for bulk material (Diagram B).
Figure 9:
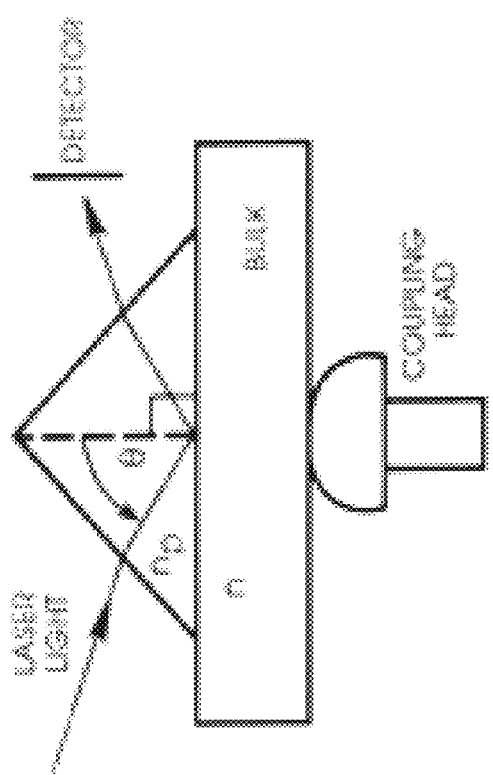

When acting as a refractometer to measure index of bulk materials (see, FIG. 9, Diagram B), the sample is also clamped against the prism and index is determined by measuring the critical angle $\theta_c$ for the sample/prism interface. Films thicker than 10-15 microns usually show a clear critical angle knee and can be measured as bulk materials. Flexible materials are easily measured and a cell is available for liquid measurements. Unlike most conventional refractometers, which are single-wavelength (typically 589 nm), the 2010/M can be equipped with as many as five lasers, allowing easy measurement of dispersion across a wide wavelength range.

By changing the polarization state of the laser, index anisotropy (birefringence) can be measured in x, y, and z directions for both thin films and bulk materials.

The invention claimed is:

1. An antireflective (AR) coating comprising one or more chalcogenide hybrid organic/inorganic polymers (CHIPS), where the antireflection coating is applied to a substrate, wherein the one or more CHIPS are prepared from one or more monomers comprising sulfur monomers derived from (i) elemental sulfur; (ii) elemental selenium ($Se_8$); and (iii) one or more comonomers each selected from a group consisting of amine comonomers, thiol comonomers, sulfide comonomers, alkynyl unsaturated comonomers, epoxide comonomers, nitrone comonomers, aldehyde comonomers, ketone comonomers, thiirane comonomers, ethylenically unsaturated comonomers, styrenic comonomers, vinylic comonomers, methacrylate comonomers, acrylonitrile comonomers, allylic monomers, acrylate monomers, vinylpyridine monomers, isobutylene monomers, maleimide monomers, norbornene monomers, monomers having at least one vinyl ether moiety, and monomers having at least one isopropenyl moiety.

2. The coating of claim 1, wherein infrared light in the 700-5000 nm wavelength spectrum is preferentially transmitted through the coating as compared to the incident light.

3. The antireflective (AR) coating of claim 1, wherein the substrate comprises a high refractive index infrared optical material comprising germanium, silicon, or zinc selenide.

4. The antireflective (AR) coating of claim 1, wherein the coating has a thickness in the range of 0.1 to 0.4 of the ratio of at least 25% of the range of the wavelengths of the incident light divided by the refractive index of the coating.

5. The antireflective (AR) coating of claim 1, wherein the coating is a single layer, multiple layers, or a textured layer.

6. The antireflective (AR) coating of claim 1, wherein the one or more CHIPS are prepared from one or more monomers comprising sulfur monomers derived from elemental sulfur, and elemental selenium ($Se_8$) or selenium sulfide, or a combination thereof.

7. The antireflective (AR) coating of claim 1, wherein the one or more CHIPS comprises poly(sulfur-random-(1,3-diisopropenylbenzene)(poly(S-r-DIB)) copolymers.

8. The antireflective (AR) coating of claim 7, wherein the one or more CHIPS comprises at least 50% sulfur monomers.

9. The antireflective (AR) coating of claim 1, wherein the comprising one or more chalcogenide hybrid organic/inorganic polymers (CHIPS) comprises poly(sulfur-random-selenium-random-1,3 diisopropenylbenzene)(poly(S-r-Se-r-DIB)) terpolymers.

10. The antireflective (AR) coating of claim 9, wherein the one or more CHIPS comprises about 5-50 wt % of elemental sulfur ($S_8$).

11. The antireflective (AR) coating of claim 9, wherein the one or more CHIPS comprises about 5-50 wt % of elemental selenium ($Se_8$).

12. The antireflective (AR) coating of claim 1, wherein the coating has a thickness in the range of 0.2 to 0.3 of the ratio of at least 25% of the range of the wavelengths of the incident light divided by the refractive index of the coating.

13. The antireflective (AR) coating of claim 1, wherein the one or more CHIPS are prepared from one or more monomers comprising sulfur monomers derived from (i) elemental sulfur; (ii) elemental selenium ($Se_8$); and (iii) one or more norbornene monomers.

14. A method of applying the antireflective (AR) coating of claim 1 to the substrate, the method comprising contacting the coating with the surface of the substrate.

15. The method of claim 14, wherein said contacting comprises spin coating.

16. The method of claim 14, wherein the substrate is silicon, glass, plastic, inorganic oxides, germanium surface, an inorganic transmissive device component, a lens, or optical device component.

17. The method of claim 14, wherein the material comprises glass, silicon, and germanium.

18. A high refractive index inorganic transmissive material operating in the near and short-wave infrared regions (NIR through MWIR) comprising an antireflective coating of claim 1.

19. A lens or optical system in a camera, wherein one or more components of the optical system comprises the coating of claim 1.

* * * * *